US012681279B2

(12) United States Patent
Liu et al.

(10) Patent No.: US 12,681,279 B2
(45) Date of Patent: Jul. 14, 2026

(54) OPTICAL DEVICE AND PRISM MODULE THEREOF

(71) Applicants: Sintai Optical (Shenzhen) Co., Ltd., ShenZhen City (CN); Asia Optical Co., Inc., Taichung (TW)

(72) Inventors: Hua-Tang Liu, Taichung (TW); Sheng Luo, ShenZhen (CN); Yue-Ye Chen, ShenZhen (CN); Lian Zhao, ShenZhen (CN); Fei Han, ShenZhen (CN)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 591 days.

(21) Appl. No.: 18/341,889

(22) Filed: Jun. 27, 2023

(65) Prior Publication Data

US 2024/0019672 A1     Jan. 18, 2024

(30) Foreign Application Priority Data

Jul. 14, 2022     (CN) .......................... 202210824298.2

(51) Int. Cl.
    *G02B 17/04*        (2006.01)
    *G01C 3/08*         (2006.01)
(52) U.S. Cl.
    CPC ............... *G02B 17/04* (2013.01); *G01C 3/08* (2013.01)
(58) Field of Classification Search
    CPC .... G02B 17/04; G02B 5/045; G02B 27/1006; G02B 27/104; G02B 27/27; G02B 27/142; G02B 27/126; G01C 3/02; G01C 3/08

USPC ....... 359/831, 638, 834, 836, 835; 356/4.01, 356/5.01
See application file for complete search history.

(56) References Cited

U.S. PATENT DOCUMENTS

| | | | | |
|---|---|---|---|---|
| 6,788,455 | B2 * | 9/2004 | Kirchhuebel .......... | G02B 17/04 |
| | | | | 359/368 |
| 6,867,916 | B2 * | 3/2005 | Koyama ................ | G02B 23/14 |
| | | | | 359/431 |
| 10,288,735 | B1 | 5/2019 | Wang et al. | |
| 2001/0026409 | A1 * | 10/2001 | Kanai ...................... | G02B 5/04 |
| | | | | 359/833 |
| 2004/0075918 | A1 * | 4/2004 | Bendat ..................... | G02B 5/04 |
| | | | | 359/834 |

(Continued)

FOREIGN PATENT DOCUMENTS

| | | |
|---|---|---|
| CN | 113534313 A | 10/2021 |
| CN | 114730025 A | 7/2022 |
| TW | 202129227 A | 8/2021 |

*Primary Examiner* — Wyatt A Stoffa
*Assistant Examiner* — Seth D Moser
(74) *Attorney, Agent, or Firm* — McClure, Qualey & Rodack, LLP

(57)     ABSTRACT

An optical device and the prism module thereof are provided. The prism module includes a first prism, a second prism, a third prism and a fourth prism. The second prism is disposed beside the first prism. The second prism is attached to the third prism and the fourth prism. In operation, first visible light enters the first prism, is reflected plural times in the first prism, enters the second prism and then the fourth prism, is reflected at least one time in the fourth prism, returns to the second prism, is reflected at least one time in the second prism, enters the third prism and exits from the third prism. Also, second visible light enters the third prism, is reflected plural times in the third prism and exits from the third prism.

20 Claims, 6 Drawing Sheets

(56)　　　　　References Cited

U.S. PATENT DOCUMENTS

| | | | |
|---|---|---|---|
| 2004/0184023 A1* | 9/2004 | Kao | G01C 3/08 |
| | | | 356/4.01 |
| 2016/0187131 A1* | 6/2016 | Chang | G02B 23/14 |
| | | | 356/4.01 |
| 2020/0340810 A1* | 10/2020 | Ma | G02B 27/1006 |
| 2020/0341261 A1* | 10/2020 | Qian | G02B 17/04 |
| 2021/0325178 A1 | 10/2021 | Liu et al. | |
| 2023/0221095 A1* | 7/2023 | Zhou | F41G 1/38 |
| | | | 42/119 |
| 2023/0359014 A1* | 11/2023 | Zhu | G02B 27/10 |
| 2024/0263919 A1* | 8/2024 | Lin | F41G 1/473 |

\* cited by examiner

OPTICAL DEVICE AND PRISM MODULE THEREOF

BACKGROUND OF THE INVENTION

Field of the Invention

The invention relates to an optical device and the prism module thereof.

Description of the Related Art

Currently, a prism assembly used in a rangefinder is a Schmidt-Pechan prism. In order to well arrange the emitting/receiving system and the displaying system in the rangefinder, providing an additional prism assembly to split light is required. However, such a rangefinder has increased width and height. Further, if the Schmidt-Pechan prism is off-axis in arrangement, then the volume of the prism assembly will be large and the producing cost will be increased. Therefore, a design of new structure is required to address the issue.

BRIEF SUMMARY OF THE INVENTION

An object of the invention is to provide an optical device and the prism module thereof. The optical device has a compact structure. Due to the reduced volume, the displaying system of the optical device has a shorted light path so that the attenuation of light energy can be effectively reduced and the brightness can be promoted.

The prism module in accordance with an exemplary embodiment of the invention includes a first prism, a second prism, a third prism and a fourth prism. The first prism includes a first surface, a second surface and a third surface wherein the first surface adjoins the second surface, and the third surface is disposed opposite to an included angle between the first surface and the second surface. The second prism includes a fourth surface, a fifth surface and a sixth surface wherein the fourth surface adjoins both of the fifth surface and the sixth surface and is disposed towards the second surface of the first prism. The third prism includes a seventh surface and an eighth surface, wherein the seventh surface is disposed towards the sixth surface of the second prism, and the eighth surface is disposed opposite to the seventh surface. The fourth prism includes a tenth surface and an eleventh surface, wherein the eleventh surface adjoins the tenth surface and is disposed towards the fifth surface of the second prism. First visible light enters the first prism through the first surface, is sequentially reflected on the second surface, the third surface and the first surface, exits from the second surface of the first prism, enters the second prism through the fourth surface, passes through the fifth surface, enters the fourth prism through the eleventh surface, is reflected on the tenth surface of the fourth prism, passes through the eleventh surface, enters the second prism through the fifth surface, is reflected on the fourth surface of the second prism, sequentially passes through the sixth surface and the seventh surface, enters the third prism, and exits from the eighth surface of the third prism.

In another exemplary embodiment, the prism module further includes a first film and a second film, wherein the first film is disposed between the eleventh surface and the fifth surface and allows the first visible light to pass through, and the second film is disposed between the sixth surface and the seventh surface and allows the first visible light to pass through.

In yet another exemplary embodiment, the third prism further includes a ninth surface which adjoins both of the seventh surface and the eighth surface. Second visible light enters the third prism through the ninth surface, is sequentially reflected on the eighth surface and the seventh surface of the third prism, and exits from the eighth surface of the third prism. When exiting from the eighth surface of the third prism, the second visible light overlaps the first visible light.

In another exemplary embodiment, the prism module further includes a second film disposed between the sixth surface and the seventh surface to reflect the second visible light.

In yet another exemplary embodiment, the first prism is a roof prism, and the second surface and the fourth surface are spaced.

The invention also provides an optical device. In an exemplary embodiment, the optical device includes the above-mentioned prism module, a light splitter and a display. The light splitter adjoins the ninth surface of the third prism. The display generates the second visible light. The second visible light passes through the light splitter and enters the third prism through the ninth surface.

In another exemplary embodiment, a travel direction in which the second visible light enters the light splitter and that in which the second visible light exits from the light splitter are the same.

In yet another exemplary embodiment, the prism module includes a first prism, a second prism, a third prism and a first film. The first prism includes a first surface, a second surface and a third surface wherein the first surface adjoins the second surface, and the third surface is disposed opposite to an included angle between the first surface and the second surface. The second prism includes a fourth surface, a fifth surface and a sixth surface wherein the fourth surface adjoins both of the fifth surface and the sixth surface and is disposed towards the second surface of the first prism. The third prism includes a seventh surface, an eighth surface and a ninth surface, wherein the seventh surface is disposed towards the sixth surface of the second prism, and the ninth surface adjoins both of the seventh surface and the eighth surface. The first film adjoins the fifth surface. Invisible light enters the third prism through the ninth surface, is reflected on the eighth surface, passes through the seventh surface, enters the second prism through the sixth surface, is reflected on the fifth surface, exits from the fourth surface of the second prism, enters the first prism through the second surface, is sequentially reflected on the first surface, the third surface and the second surface of the first prism, and exits from the first surface of the first prism. The first film reflects the invisible light.

In another exemplary embodiment, the first prism is a roof prism, and the second surface and the fourth surface are spaced.

In yet another exemplary embodiment, the optical device includes the above-mentioned prism module, a light splitter, a light emitter and a light receiver. The light splitter adjoins the ninth surface of the third prism. The light emitter generates the invisible light which passes through the light splitter and enters the third prism. After exiting from the first surface of the first prism, the invisible light reaches a target object, is reflected back to the optical device by the target object, and is received by the light receiver.

In yet another exemplary embodiment, a travel direction in which the invisible light enters the first prism and that in which the invisible light exits from the first prism are in parallel.

In another exemplary embodiment, second visible light passes through the light splitter, enters the third prism through the ninth surface, is sequentially reflected on the eighth surface and the seventh surface of the third prism, and exits from the eighth surface of the third prism.

In yet another exemplary embodiment, a travel direction in which the second visible light enters the light splitter and that in which the second visible light exits from the light splitter are the same. A travel direction in which the invisible light enters the light splitter and that in which the invisible light exits from the light splitter are different. Both of the invisible light and the second visible light enter the third prism through the ninth surface.

In another exemplary embodiment, the optical device further includes a second film disposed between the sixth surface and the seventh surface wherein the second film allows the invisible light to pass through but reflects the second visible light.

In yet another exemplary embodiment, the invisible light and the second visible light enters the third prism through the ninth surface.

In another exemplary embodiment, a prism module includes a first prism, a second prism, a third prism and a first film. The first prism includes a first surface, a second surface and a third surface wherein the first surface adjoins the second surface, and the third surface is disposed opposite to an included angle between the first surface and the second surface. The second prism includes a fourth surface, a fifth surface and a sixth surface wherein the fourth surface adjoins both of the fifth surface and the sixth surface and is disposed towards the second surface of the first prism. The third prism includes a seventh surface, an eighth surface and a ninth surface, wherein the seventh surface is disposed towards the sixth surface of the second prism, and the ninth surface adjoins both of the seventh surface and the eighth surface. The first film adjoins the fifth surface. Invisible light is reflected to the prism module by a target object, enters the first prism through the first surface, is sequentially reflected on the second surface, the third surface and the first surface, exits from the first prism through the second surface, enters the second prism through the fourth surface, is reflected on the fifth surface, sequentially passes through the sixth surface and the second film, enters the third prism through the seventh surface, is reflected on the eighth surface, and exits from the third prism through the ninth surface. The first film reflects the invisible light.

In yet another exemplary embodiment, the first prism is a roof prism, and the second surface and the fourth surface are spaced.

In another exemplary embodiment, an optical device includes the above-mentioned prism module, a light emitter and a light receiver. The light emitter generates the invisible light that travels to the target object. The light receiver receives the invisible light that exits from the third prism through the ninth surface.

In yet another exemplary embodiment, the prism module further includes a second film disposed between the sixth surface and the seventh surface, and the second film allows the invisible light to pass through.

In another exemplary embodiment, a travel direction in which the invisible light travels to the target object and that in which the invisible light exits from the third prism are in parallel.

DETAILED DESCRIPTION OF THE INVENTION

Figure 1:
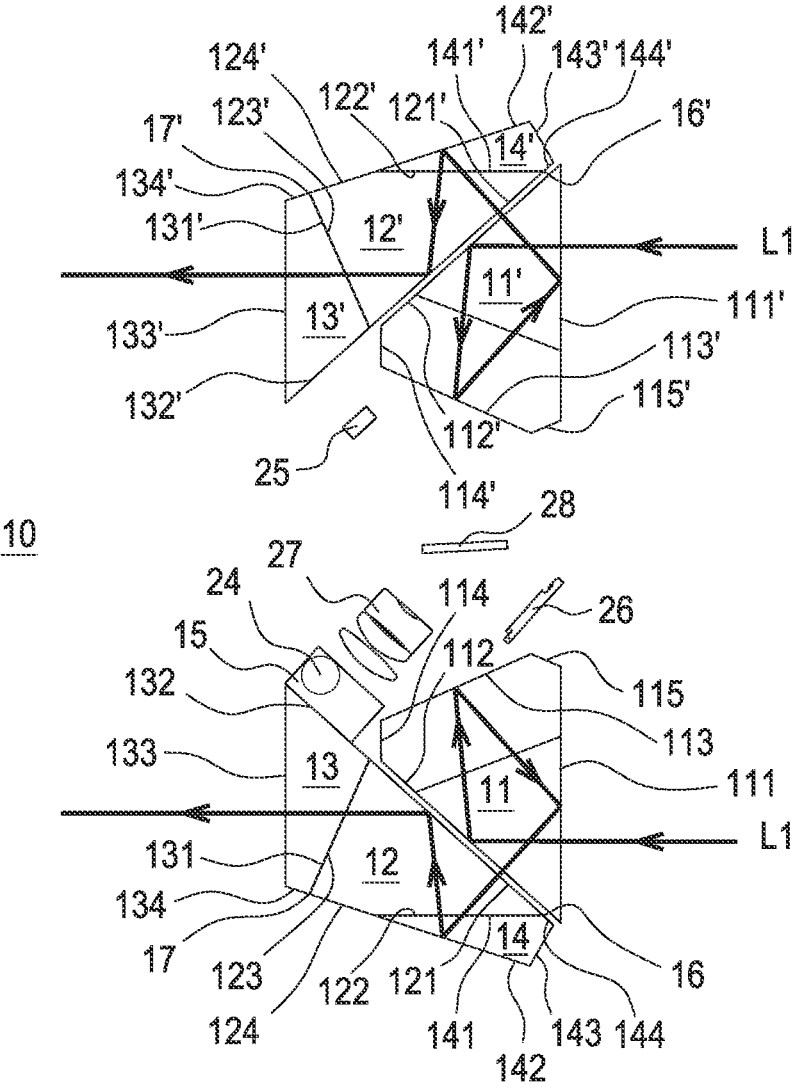
FIG. 1 depicts a prism module and a first visible light path thereof in accordance with an embodiment of the invention.

The prism module of the invention includes at least a first prism, at least a second prism, at least a third prism, at least a fourth prism and a light splitter to perform the telephoto function, the range finding function and/or the light splitting for the display. Referring to FIG. 1, the prism module 10 in accordance with an embodiment of the invention includes two first prisms 11, 11', two second prisms 12, 12', two third prisms 13, 13', two fourth prisms 14, 14', two first films 16, 16', two second films 17, 17' and a light splitter 15. The structure of each elements is described below in detail:

The first prism 11 is a roof prism and includes a first surface 111, a second surface 112, a third surface 113, a twelfth surface 114 and a thirteenth surface 115. The first surface 111 adjoins the second surface 112. The twelfth surface 114 adjoins both of the second surface 112 and the third surface 113. The thirteenth surface 115 adjoins both of the third surface 113 and the first surface 111. Accordingly, the third surface 113 is disposed opposite to the included angle between the first surface 111 and the second surface 112. The third surface 113 is a roof surface that includes two surfaces, and the two surfaces have an included angle of ninety degrees therebetween.

The second prism 12 is disposed beside the first prism 11. The first prism 11 and the second prism 12 have a gap therebetween. The second prism 12 includes a fourth surface 121, a fifth surface 122, a sixth surface 123 and a fourteenth surface 124. The fourth surface 121 adjoins both of the fifth surface 122 and the sixth surface 123 and is disposed towards the second surface 112 of the first prism 11. The fourteenth surface 124 is disposed opposite to the fourth surface 121 and adjoins both of the fifth surface 122 and the sixth surface 123.

The third prism 13 includes a seventh surface 131, an eighth surface 133, a ninth surface 132 and a fifteenth surface 134. The seventh surface 131 is disposed towards the sixth surface 123 of the second prism 12. The ninth surface 132 is attached to the light splitter 15 and adjoins both of the seventh surface 131 and the eighth surface 133. The fifteenth surface 134 is disposed opposite to the ninth surface 132 and adjoins both of the seventh surface 131 and the eighth surface 133.

The fourth prism 14 includes a tenth surface 142, an eleventh surface 141, a sixteenth surface 143 and a seventeenth surface 144. The eleventh surface 141 adjoins both of the tenth surface 142 and a seventeenth surface 144 and is disposed towards the fifth surface 122 of the second prism 12. The sixteenth surface 143 is disposed opposite to the eleventh surface 141 and adjoins both of the tenth surface 142 and the seventeenth surface 144.

The first film 16 is disposed between the second prism 12 and the fourth prism 14. Specifically, the first film 16 is disposed between the eleventh surface 141 and the fifth surface 122, wherein the first film 16 is formed on the eleventh surface 141 or the fifth surface 122 and then the second prism 12 and the fourth prism 14 are combined. The first film 16 allows visible light that has a specific range of wavelengths to pass through but reflects invisible light that has another specific range of wavelengths, wherein the visible light and the invisible light are, for example, the first visible light L1 and the invisible light L2 described in the following.

The second film 17 is disposed between the second prism 12 and the third prism 13. Specifically, the second film 17 is disposed between the sixth surface 123 and the seventh surface 131, wherein the second film 17 is formed on the sixth surface 123 or the seventh surface 131 and then the second prism 12 and the third prism 13 are combined. The second film 17 allows invisible light that has a specific range of wavelengths (e.g. the invisible light L2 described in the following) and visible light that has another specific range of wavelengths (e.g. the visible light L1 described in the following) to pass through, but reflects visible light that has another specific range of wavelengths (e.g. the visible light L3 described in the following).

Figure 2A:
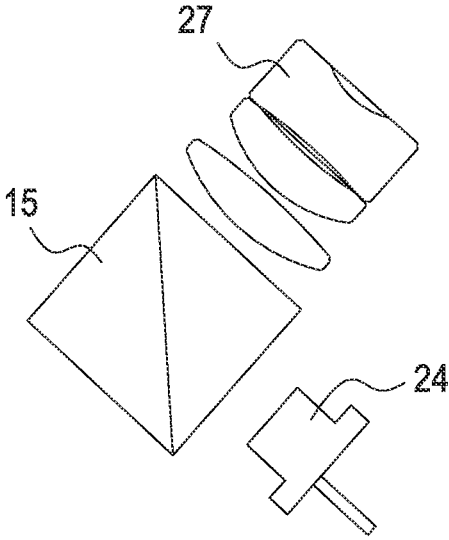
FIG. 2A is a side view of the light splitter of the prism module of FIG. 1, a light emitter and a lens assembly.
Figure 2B:
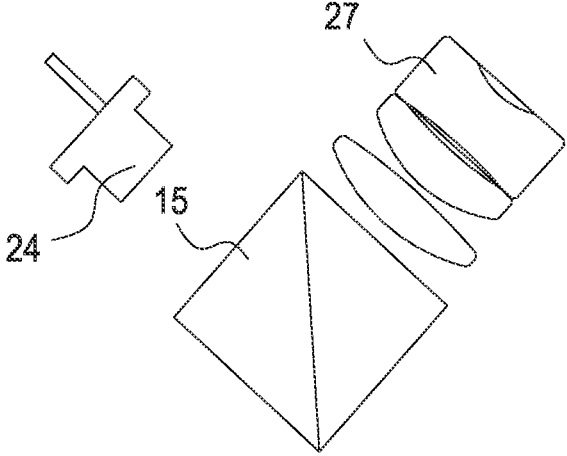
FIG. 2B is a side view of the light splitter of the prism module, the light emitter and the lens assembly arranged in a different way from those of FIG. 2A.

FIG. 2A is a side view of the light splitter 15 of FIG. 1, a light emitter 24 and a lens assembly 27. As shown in FIG. 2A, the light splitter 15 is cubic and includes two right-angle prisms attached to each other. It is worth noting that the light splitter 15, the light emitter 24 and the lens assembly 27 can be arranged in an alternative way as shown in FIG. 2B.

The first prism 11' and the first prism 11 have the same shape and are placed in a symmetrical arrangement. Therefore, the first prism 11' is also a roof prism and includes a first surface 111', a second surface 112', a third surface 113', a twelfth surface 114' and a thirteenth surface 115'. The first surface 111' adjoins the second surface 112'. The twelfth surface 114' adjoins both of the second surface 112' and the third surface 113'. The thirteenth surface 115' adjoins both of the third surface 113' and the first surface 111'. Accordingly, the third surface 113' is disposed opposite to the included angle between the first surface 111' and the second surface 112'. The third surface 113' is a roof surface that includes two surfaces, and the two surfaces have an included angle of ninety degrees therebetween.

The second prism 12' is disposed beside the first prism 11'. The first prism 11' and the second prism 12' have a gap therebetween. The second prism 12' and the second prism 12 have the same shape and are placed in a symmetrical arrangement. Therefore, the second prism 12' also includes a fourth surface 121', a fifth surface 122', a sixth surface 123' and a fourteenth surface 124'. The fourth surface 121' adjoins both of the fifth surface 122' and the sixth surface 123' and is disposed towards the second surface 112' of the first prism 11'. The fourteenth surface 124' is disposed opposite to the fourth surface 121' and adjoins both of the fifth surface 122' and the sixth surface 123'.

The third prism 13' and the third prism 13 have the same shape and are placed in a symmetrical arrangement. Therefore, the third prism 13' includes a seventh surface 131', an eighth surface 133', a ninth surface 132' and a fifteenth surface 134'. The seventh surface 131' is disposed towards the sixth surface 123' of the second prism 12'. The ninth surface 132' adjoins both of the seventh surface 131' and the eighth surface 133'. The fifteenth surface 134' is disposed opposite to the ninth surface 132' and adjoins both of the seventh surface 131' and the eighth surface 133'.

The fourth prism 14' and the fourth prism 14 have the same shape and are placed in a symmetrical arrangement. Therefore, the fourth prism 14' includes a tenth surface 142', an eleventh surface 141', a sixteenth surface 143' and a seventeenth surface 144'. The eleventh surface 141' adjoins both of the tenth surface 142' and a seventeenth surface 144' and is disposed towards the fifth surface 122' of the second prism 12'. The sixteenth surface 143' is disposed opposite to the eleventh surface 141' and adjoins both of the tenth surface 142' and the seventeenth surface 144'.

The first film 16' is disposed between the second prism 12' and the fourth prism 14'. Specifically, the first film 16' is disposed between the eleventh surface 141' and the fifth surface 122', wherein the first film 16' is formed on the eleventh surface 141' or the fifth surface 122' and then the second prism 12' and the fourth prism 14' are combined. The first film 16' allows visible light that has a specific range of wavelengths to pass through (e.g. the first visible light L1 described in the following) but reflects invisible light that has another specific range of wavelengths (e.g. the invisible light L2 described in the following).

The second film 17' is disposed between the second prism 12' and the third prism 13'. Specifically, the second film 17' is disposed between the sixth surface 123' and the seventh surface 131', wherein the second film 17' is formed on the sixth surface 123' or the seventh surface 131' and then the second prism 12' and the third prism 13' are combined. The second film 17' allows invisible light that has a specific range of wavelengths (e.g. the invisible light L2 described in the following) and visible light that has another specific range of wavelengths (e.g. the visible light L1 described in the following) to pass through.

The prism module 10 of the invention can be installed in various optical devices (e.g. telescopes) enabling the user to observe the surrounding environment. Referring to FIG. 1, first visible light L1 (e.g. environmental light) enters the first prisms 11, 11' through the first surfaces 111, 111', is sequentially reflected on the second surfaces 112, 112', the third surfaces 113, 113', and the first surfaces 111, 111', exits from the second surfaces 112, 112' of the first prisms 11, 11', enters the second prisms 12, 12' through the fourth surfaces 121, 121', sequentially passes through the fifth surfaces 122, 122' and the first films 16, 16', enters the fourth prisms 14, 14' through the eleventh surfaces 141, 141', is reflected on the tenth surfaces 142, 142', sequentially passes through the eleventh surfaces 141, 141' and the first films 16, 16', enters the second prisms 12, 12' through the fifth surfaces 122, 122', is reflected on the fourth surfaces 121, 121', sequentially passes through the sixth surfaces 123, 123', the second films 17, 17' and the seventh surfaces 131, 131', enters the third prisms 13, 13', exits from the eighth surfaces 133, 133' of the third prisms 13, 13', and reaches user's eyes. It is worth noting that the prism module 10 in some other embodiments may have a single first prism 11 (or 11'), a single second prism 12 (or 12'), a single third prism 13 (or 13'), and a single fourth prism 14 (or 14') to receive the first visible light L1 for user's observation.

Figure 3:
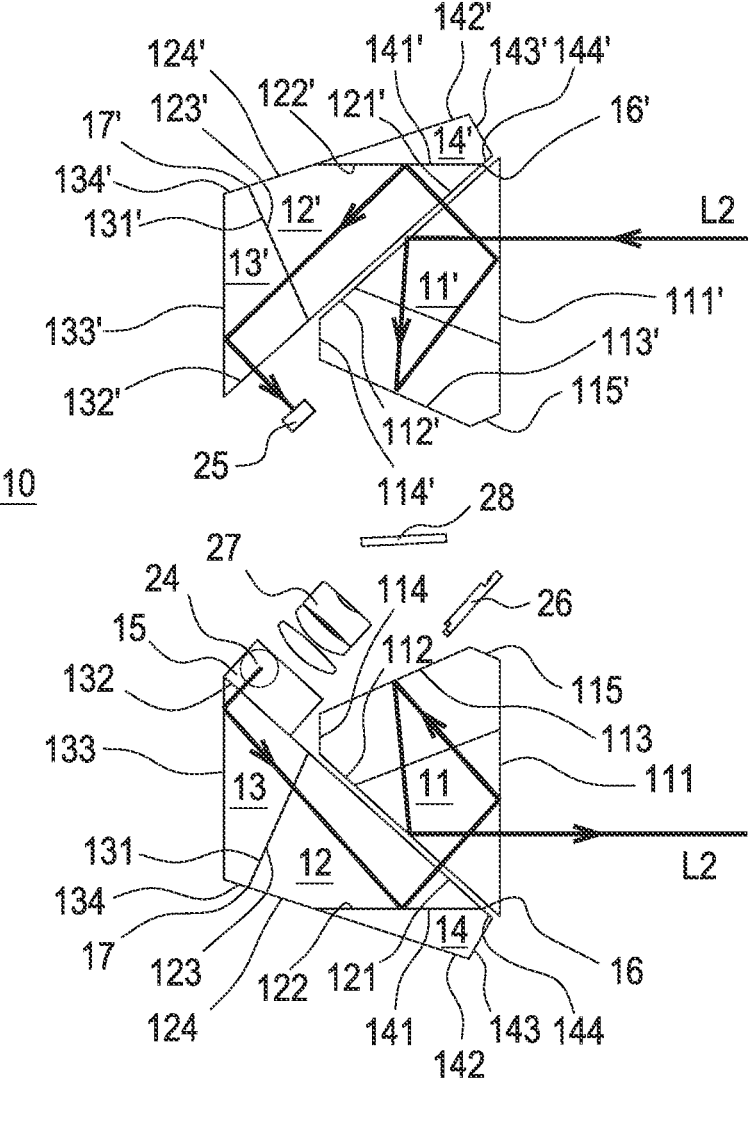
FIG. 3 depicts the prism module of FIG. 1 and an invisible light path thereof.

The prism module 10 of the invention may be used together with a light emitter and a light receiver to measure the distance of a target object when the target object is observed. FIG. 3 depicts a light path of invisible light of the invention. In operation, invisible light L2 (e.g. distance measuring light) is emitted by a light emitter 24, passes through the light splitter 15, enters the third prism 13 through the ninth surface 132, is reflected on the eighth surface 133, sequentially passes through the seventh surface 131 and the second film 17, enters the second prism 12 through the sixth surface 123, is reflected on the fifth surface 122, exits from the fourth surface 121 of the second prism 12, enters the first prism 11 through the second surface 112, is sequentially reflected on the first surface 111, the third surface 113, and the second surface 112, exits from the first surface 111 of the first prism 11, reaches a target object (not shown), is reflected back to the prism module by the target object, enters the first prism 11' through the first surface 111', is sequentially reflected on the second surface 112', the third surface 113' and the first surface 111', exits from the second surface 112' of the first prism 11', enters the second prism 12' through the fourth surface 121', is reflected on the fifth surface 122', sequentially passes through the sixth surface 123' and the second film 17', enters the third prism 13' through the seventh surface 131', is reflected on the eighth surface 133', exits from the ninth surface 132' of the third prism 13', and is received by the light receiver 25. Then, the distance of the target object can be obtained by using the formula: Distance=(Light Speed)×(Time Difference)÷2 wherein the time difference is the difference between the time at which the invisible light L2 is received and the time at which the invisible light L2 is emitted.

It is worth noting that the travel direction in which the invisible light L2 exits from the first prisms 11 and the travel direction in which the invisible light L2 reflected by the target object enters the first prisms 11' are parallel to each other.

The described light emitter 24 may be a laser diode (LD) or other light sources. The described light receiver 25 may be a photoelectric diode (PD), a photomultiplier tube (PMT), a charge coupled device (CCD), an avalanche photodiode (APD), a single-photon avalanche diode (SPAD) or other light detectors.

Figure 4:
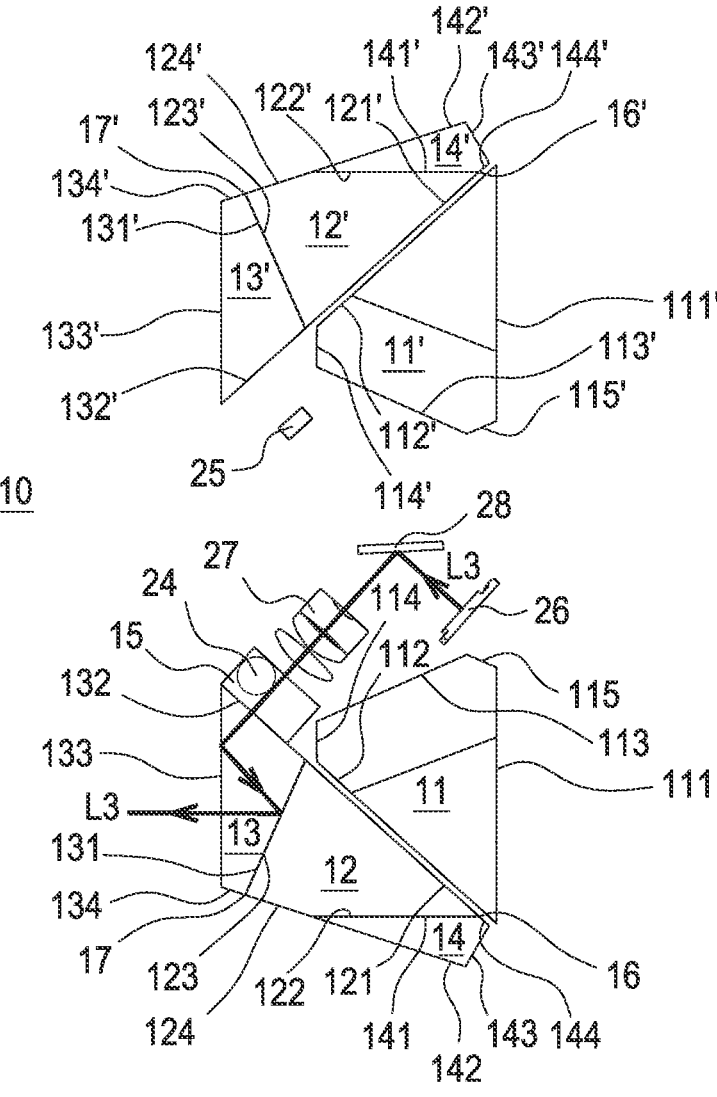
FIG. 4 depicts the prism module of FIG. 1 and a second visible light path thereof.

A display may be used along with the prism module 10 of the invention to provide some important information for user's reference. As shown in FIG. 4, second visible light L3 containing a message of the measured distance is emitted by a display 26, is reflected by a reflecting mirror 28, sequentially passes through a lens assembly 27 and the light splitter 15, enters the third prism 13 through the ninth surface 132, is sequentially reflected on the eighth surface 133 and the seventh surface 131 of the third prism 13, exits from the eighth surface 133 of the third prism 13, and reaches user's eye for reference. It is worth noting that the second visible light L3 exiting from the eighth surface 133 of the third prism 13 overlaps the first visible light L1. Further, both of the invisible light L2 and the second visible light L3 enter the third prism 13 through the same surface, namely the ninth surface 132.

The display 26 may be an organic light-emitting diode (OLED), a liquid crystal display (LCD) or other displaying devices.

In the invention, the travel direction in which the second visible light L3 enters the light splitter 15 and that in which the second visible light L3 exits from the light splitter are the same. The travel direction in which the invisible light L2 enters the light splitter and that in which the invisible light L2 exits from the light splitter 15 are different. Further, both of the invisible light L2 and the second visible light L3 enter the third prism 13 through the ninth surface 132.

Figure 5:
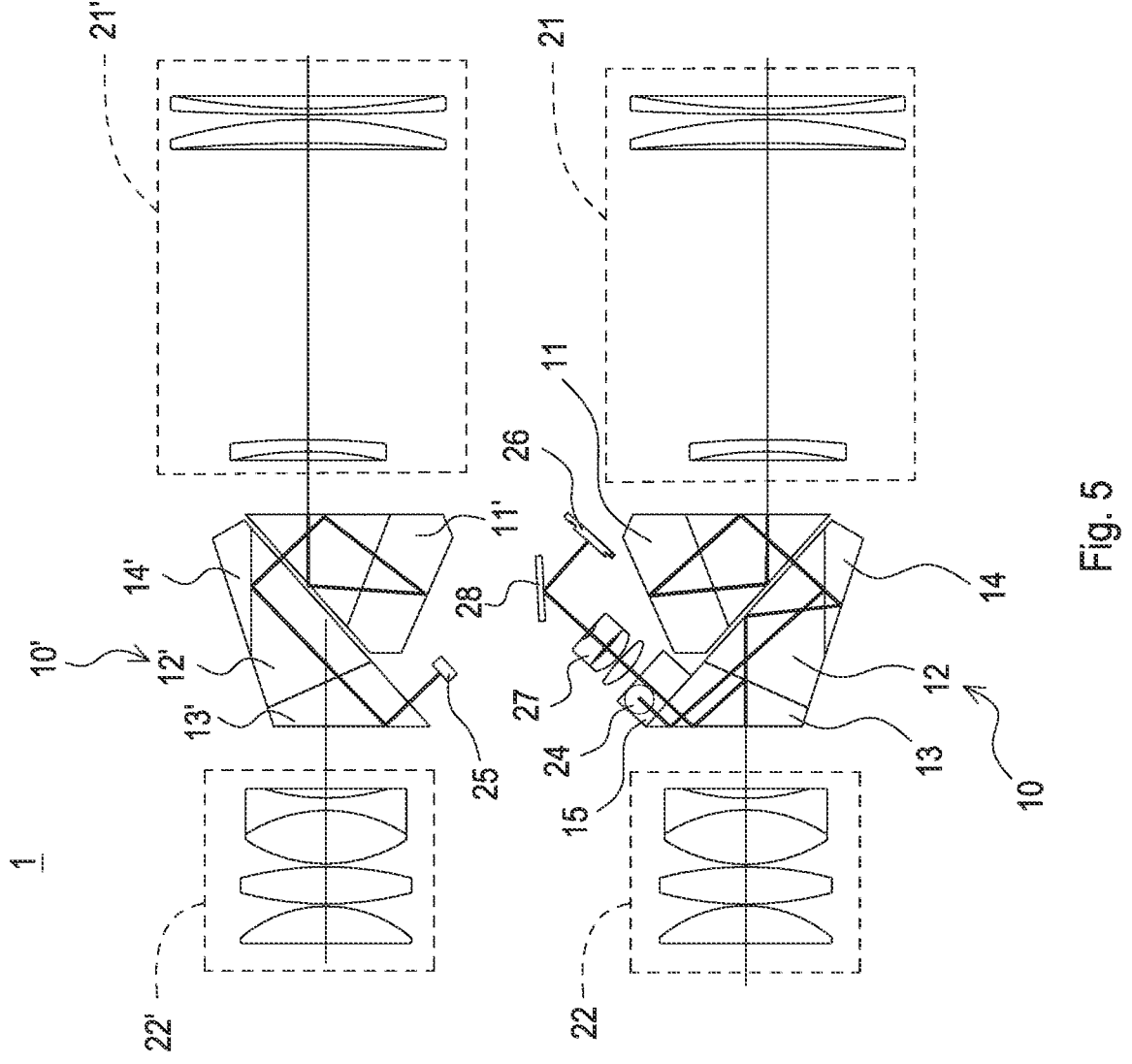
FIG. 5 is a schematic diagram showing the structure of rangefinder binoculars provided with the prism module of the invention that is an application of the prism module of the invention.

An application of the prism module of the invention is shown in FIG. 5. FIG. 5 is a schematic diagram showing the structure of rangefinder binoculars 1 provided with the prism module of the invention, wherein the rangefinder binoculars 1 includes a light emitting part and a light receiving part. The light emitting part includes an object lens unit 21, a light emitter 24, a prism module 10, a display 26, a lens assembly 27, a reflecting mirror 28 and an eyepiece unit 22. The light receiving part includes an object lens unit 21', a light receiver 25, a prism module 10' and an eyepiece unit 22'.

When a user observes the surrounding environment with the rangefinder binoculars 1, the first visible light passes through the object lens units 21, 21', the prism modules 10, 10' and the eyepiece units 22, 22', and reaches user's eyes for an observation. Also, invisible light is emitted by the light emitter 24, passes through the prism module 10 and the object lens unit 21, reaches a target object (not shown), is reflected back to the rangefinder binoculars 1 by the target object, passes through the object lens unit 21' and the prism module 10', and reaches the light receiver 25. The distance of the target object can be obtained by using the time difference. The time difference is a difference between the time at which the invisible light is received and the time at which the invisible light is emitted. Further, second visible light is generated by the display 26, is reflected by the reflecting mirror 28, passes through the lens assembly 27, the light splitter 15 and the third prism 13 of the prism module 10, and the eyepiece unit 22, and reaches user's eye, thereby providing some important messages (e.g. the measured distance and so on) for user's reference.

In conclusion, the prism module of the invention has at least four prisms used along with at least one light splitter. When the prism module is installed in an optical device, the optical device can perform the telephoto function, the range finding function and/or the light splitting for the display. Further, the optical device can have a compact structure without a bulge in appearance. Due to the reduced volume of the optical device, the light path of the displaying system is shortened, the attenuation of light energy is effectively reduced, and the brightness is promoted.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A prism module, comprising:
a first prism comprising a first surface, a second surface and a third surface wherein the first surface adjoins the second surface, and the third surface is disposed opposite to an included angle between the first surface and the second surface;
a second prism comprising a fourth surface, a fifth surface and a sixth surface wherein the fourth surface adjoins both of the fifth surface and the sixth surface and is disposed towards the second surface of the first prism;
a third prism comprising a seventh surface and an eighth surface, wherein the seventh surface is disposed towards the sixth surface of the second prism, and the eighth surface is disposed opposite to the seventh surface;
a fourth prism comprising a tenth surface and an eleventh surface, wherein the eleventh surface adjoins the tenth surface and is disposed towards the fifth surface of the second prism;
wherein first visible light enters the first prism through the first surface, is sequentially reflected on the second surface, the third surface and the first surface, exits from the second surface of the first prism, enters the second prism through the fourth surface, passes through the fifth surface, enters the fourth prism through the eleventh surface, is reflected on the tenth surface of the fourth prism, passes through the eleventh surface, enters the second prism through the fifth surface, is reflected on the fourth surface of the second prism, sequentially passes through the sixth surface and the seventh surface, enters the third prism, and exits from the eighth surface of the third prism.

2. The prism module as claimed in claim 1, further comprising a first film and a second film, wherein the first film is disposed between the eleventh surface and the fifth surface and allows the first visible light to pass through, and the second film is disposed between the sixth surface and the seventh surface and allows the first visible light to pass through.

3. The prism module as claimed in claim 1, wherein:
the third prism further comprises a ninth surface which adjoins both of the seventh surface and the eighth surface;
second visible light enters the third prism through the ninth surface, is sequentially reflected on the eighth surface and the seventh surface of the third prism, and exits from the eighth surface of the third prism;
when exiting from the eighth surface of the third prism, the second visible light overlaps the first visible light.

4. The prism module as claimed in claim 3, further comprising a second film disposed between the sixth surface and the seventh surface to reflect the second visible light.

5. An optical device, comprising:
the prism module as claimed in claim 3;
a light splitter adjoins the ninth surface of the third prism;
a display generating the second visible light;
wherein the second visible light passes through the light splitter and enters the third prism through the ninth surface.

6. The optical device as claimed in claim 5, wherein a travel direction in which the second visible light enters the light splitter and that in which the second visible light exits from the light splitter are the same.

7. The prism module as claimed in claim 1, wherein the first prism is a roof prism, and the second surface and the fourth surface are spaced.

8. A prism module, comprising:
a first prism comprising a first surface, a second surface and a third surface wherein the first surface adjoins the second surface, and the third surface is disposed opposite to an included angle between the first surface and the second surface;
a second prism comprising a fourth surface, a fifth surface and a sixth surface wherein the fourth surface adjoins both of the fifth surface and the sixth surface and is disposed towards the second surface of the first prism;
a third prism comprising a seventh surface, an eighth surface and a ninth surface, wherein the seventh surface is disposed towards the sixth surface of the second prism, and the ninth surface adjoins both of the seventh surface and the eighth surface;
a first film adjoins the fifth surface;
wherein invisible light enters the third prism through the ninth surface, is reflected on the eighth surface, passes through the seventh surface, enters the second prism through the sixth surface, is reflected on the fifth surface, exits from the fourth surface of the second prism, enters the first prism through the second surface, is sequentially reflected on the first surface, the third surface and the second surface of the first prism, and exits from the first surface of the first prism;
wherein the first film reflects the invisible light.

9. The prism module as claimed in claim 8, wherein the first prism is a roof prism, and the second surface and the fourth surface are spaced.

10. An optical device, comprising:
the prism module as claimed in claim 8;
a light splitter adjoining the ninth surface of the third prism;
a light emitter generating the invisible light which passes through the light splitter and enters the third prism;
a light receiver;
wherein after exiting from the first surface of the first prism, the invisible light reaches a target object, is reflected back to the optical device by the target object, and is received by the light receiver.

11. The optical device as claimed in claim 10, wherein a travel direction in which the invisible light enters the first prism and that in which the invisible light exits from the first prism are in parallel.

12. The optical device as claimed in claim 10, wherein second visible light passes through the light splitter, enters the third prism through the ninth surface, is sequentially reflected on the eighth surface and the seventh surface of the third prism, and exits from the eighth surface of the third prism.

13. The optical device as claimed in claim 12, wherein:
a travel direction in which the second visible light enters the light splitter and that in which the second visible light exits from the light splitter are the same;
a travel direction in which the invisible light enters the light splitter and that in which the invisible light exits from the light splitter are different;
both of the invisible light and the second visible light enter the third prism through the ninth surface.

14. The optical device as claimed in claim 12, further comprising a second film disposed between the sixth surface and the seventh surface wherein the second film allows the invisible light to pass through but reflects the second visible light.

15. The optical device as claimed in claim 12, wherein the invisible light and the second visible light enters the third prism through the ninth surface.

16. A prism module, comprising:
a first prism comprising a first surface, a second surface and a third surface wherein the first surface adjoins the second surface, and the third surface is disposed opposite to an included angle between the first surface and the second surface;
a second prism comprising a fourth surface, a fifth surface and a sixth surface wherein the fourth surface adjoins both of the fifth surface and the sixth surface and is disposed towards the second surface of the first prism;
a third prism comprising a seventh surface, an eighth surface and a ninth surface, wherein the seventh surface is disposed towards the sixth surface of the second prism, and the ninth surface adjoins both of the seventh surface and the eighth surface;
a first film adjoins the fifth surface;
wherein invisible light is reflected to the prism module by a target object, enters the first prism through the first surface, is sequentially reflected on the second surface, the third surface and the first surface, exits from the first prism through the second surface, enters the second prism through the fourth surface, is reflected on the fifth surface, sequentially passes through the sixth surface and the second film, enters the third prism through the seventh surface, is reflected on the eighth surface, and exits from the third prism through the ninth surface;
wherein the first film reflects the invisible light.

17. The prism module as claimed in claim 16, wherein the first prism is a roof prism, and the second surface and the fourth surface are spaced.

18. An optical device, comprising:

the prism module as claimed in claim 16;

a light emitter generating the invisible light that travels to the target object;

a light receiver receiving the invisible light that exits from the third prism through the ninth surface.

19. The optical device as claimed in claim 18, wherein the prism module further comprises a second film disposed between the sixth surface and the seventh surface, and the second film allows the invisible light to pass through.

20. The optical device as claimed in claim 18, wherein a travel direction in which the invisible light travels to the target object and that in which the invisible light exits from the third prism are in parallel.

\* \* \* \* \*